(No Model.)
T. R. CRANE.
BROADCAST SEEDER.
No. 364,576. Patented June 7, 1887.
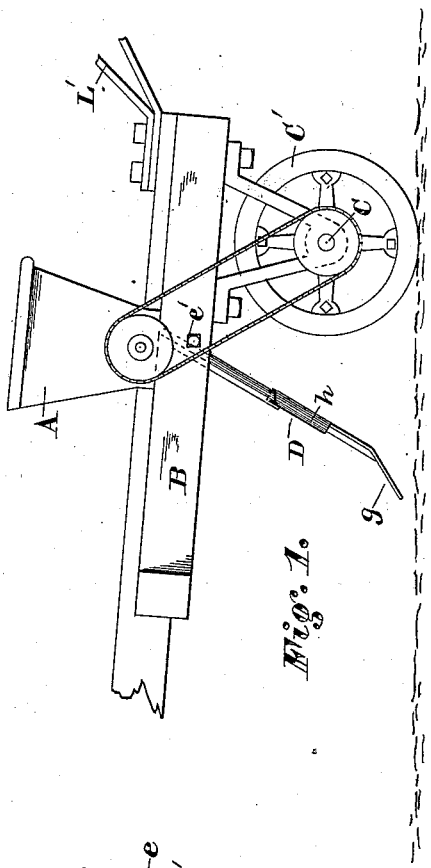
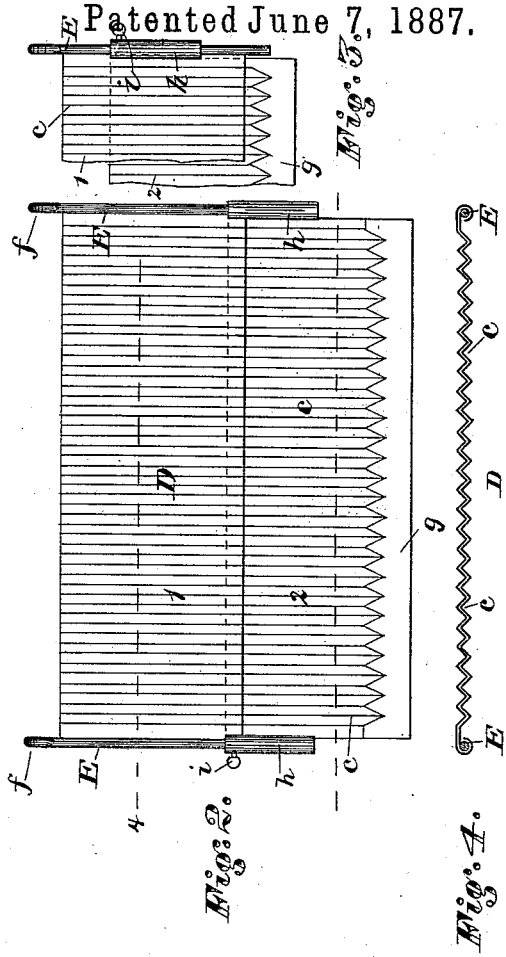
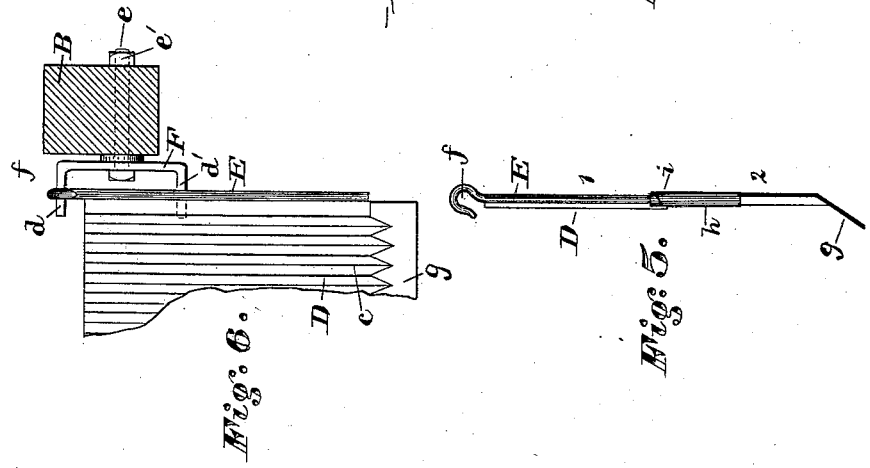
WITNESSES:
J. K. E. Diffenderffer.
A. E. Eader
INVENTOR:
Thos. R. Crane
BY Chas. B. Mann
ATTORNEY.
N. PETERS, Photo-Lithographer, Washington, D. C.

UNITED STATES PATENT OFFICE.

THOMAS R. CRANE, OF HEATHSVILLE, VIRGINIA.

BROADCAST SEEDER.

SPECIFICATION forming part of Letters Patent No. 364,576, dated June 7, 1887.

Application filed March 30, 1887. Serial No. 232,952. (No model.)

*To all whom it may concern:*

Be it known that I, THOMAS R. CRANE, a citizen of the United States, residing at Heathsville, in the county of Northumberland and State of Virginia, have invented certain new and useful Improvements in Broadcast Seeders, of which the following is a specification.

This invention relates to an improved broadcast seed-sower, and is illustrated in the drawings hereto annexed, in which—

Figure 1 is a side view of a seeder having my improved seed-conveyer apron. Fig. 2 is a front view of the seed-conveyer apron, showing it extended. Fig. 3 is also a front view showing the apron shortened. Fig. 4 is a cross-section of the apron on the line 4 4. Fig. 5 is a side or edge view of the apron. Fig. 6 is a front view of the apron and a cross-section of the frame-beam to which the apron is attached. In this case the apron is shown non-extensible.

The letter A designates a seed-hopper of any suitable kind, mounted on a frame, B, which is supported on an axle, C, and wheels C'. While wheels are here shown, the device may of course be used in conjunction with a land-roller.

The invention relates to a conveyer-apron, D, attached in an inclined position below the hopper, and onto which the seed discharged from the hopper will fall and be carried to the ground.

The apron D may be made of sheet metal or any other suitable material, and is provided with corrugations $c$, extending longitudinally from top to bottom. Each side edge of the apron is attached to a rod, E, which supports it and gives it stability. These rods E are secured to the frame B. I deem it useful to so attach the corrugated apron to the frame that it may be inclined more or less, as desired. To enable its inclination to be adjusted, a supporting-iron, F, is provided having two lateral prongs, $d\ d'$, and is attached at its center to a bolt, $e$, which passes through the side beam, B, of the frame. A nut, $e'$, on the outer side tightens the said bolt. One prong, $d$, of the supporting-iron F enters the eye or hook $f$ on the upper end of the side rod, E, and the other prong, being the lowermost one, $d'$, takes under said side rod. It will thus be seen that the pronged iron F has the bolt $e$ for a pivot, and may be tilted as desired. Whenever the iron F is tilted more or less, the inclined position of the apron D will be changed accordingly. The bolt $e$ therefore serves as a pivot for the apron D. By means of the nut $e'$ on the outer side of the frame the inclination of the apron may be changed, and it may be turned up to a horizontal position.

At its lower edge the apron has a smooth lip, $g$, which extends crosswise of the ends of all of the corrugations $c$, and serves, when the apron is made of sheet metal, to stiffen it, and also serves to spread and scatter the seed that flows down the corrugations.

Another useful feature of the apron is its extensibility, whereby it may be lengthened or shortened. To produce this, the apron D is made in two sections, 1 and 2. The corrugated portion of the upper section laps over on top of the lower section, and the latter has at each side edge a coiled gripper, $h$, which partly surrounds the edge and side rod, E, of the upper section, and is free to slide thereon up or down. It will thus be seen that the lower section, 2, may be raised, as in Fig. 3, or may be lowered, as in Fig. 2, and a set-screw, $i$, or other suitable clamp device, may be used to retain the lower section wherever set. This extension feature enables the lip $g$ to be nearer the ground when the machine is sowing seed than would be permissible if the apron could not be shortened or turned up.

The advantages of the corrugated apron as a seed-conveyer in broadcast seed-sowing will be apparent to any one experienced in such work. The corrugations on the surface of the apron prevent the wind from driving the seed away and insure a regular and even deposit of the seed.

The braces L' are to support a seat for the driver.

This improved apron seed-conveyer may be used on any grass seed sower.

Having described my invention, I claim and desire to secure by Letters Patent of the United States—

1. In a seed-sower, the combination, with the hopper, of a seed-conveyer apron made in two sections, 1 and 2, the lower one of which slides on or below the upper one, whereby the apron may be shortened or lengthened.

2. In a seed-sower, the combination, with the hopper, of a seed-conveyer apron made in two sections, 1 and 2, the lower one of which slides on or below the upper one, and is provided with a smooth lower edge, $g$, and the said upper one is provided with corrugations extending from top to bottom, as set forth.

In testimony whereof I affix my signature in the presence of two witnesses.

THOMAS R. CRANE.

Witnesses:
JOHN E. MORRIS,
JNO. T. MADDOX.